United States Patent
Cousino, Sr.

(10) Patent No.: US 8,616,005 B1
(45) Date of Patent: Dec. 31, 2013

(54) METHOD AND APPARATUS FOR BOOSTING GAS TURBINE ENGINE PERFORMANCE

(76) Inventor: Dennis James Cousino, Sr., Adair, OK (US)

(*) Notice: Subject to any disclaimer, the term of this patent is extended or adjusted under 35 U.S.C. 154(b) by 856 days.

(21) Appl. No.: 12/556,063

(22) Filed: Sep. 9, 2009

(51) Int. Cl.
*F02C 1/00* (2006.01)

(52) U.S. Cl.
USPC ............................................. 60/772; 60/793

(58) Field of Classification Search
USPC ............ 60/793, 772, 39.5, 39.511, 728, 39.3, 60/39.53, 801, 803, 39.05, 726
See application file for complete search history.

(56) References Cited

U.S. PATENT DOCUMENTS

| | | | |
|---|---|---|---|
| 3,796,045 A | 3/1974 | Foster-Pegg | |
| 4,773,846 A * | 9/1988 | Munk | 431/4 |
| 4,968,217 A | 11/1990 | Newton | |
| 5,107,676 A | 4/1992 | Hadaway et al. | |
| 5,373,698 A | 12/1994 | Taylor | |
| 5,544,479 A * | 8/1996 | Yan et al. | 60/39.183 |
| 5,577,377 A * | 11/1996 | Tomlinson | 60/783 |
| 5,769,317 A | 6/1998 | Sokhey et al. | |
| 6,308,512 B1 | 10/2001 | Kopko | |
| 6,389,794 B2 * | 5/2002 | Ranasinghe et al. | 60/775 |
| 6,397,576 B1 | 6/2002 | Rakhmailov | |
| 6,530,224 B1 | 3/2003 | Conchieri | |
| 6,880,343 B2 * | 4/2005 | Kopko | 60/772 |
| 6,943,469 B2 | 9/2005 | Nelson | |
| 7,065,953 B1 | 6/2006 | Kopko | |
| 7,096,674 B2 | 8/2006 | Orlando | |
| 7,328,570 B2 | 2/2008 | Venkataramani et al. | |
| 2002/0083712 A1 * | 7/2002 | Tomlinson et al. | 60/775 |
| 2007/0209367 A1 | 9/2007 | Bell et al. | |
| 2007/0277500 A1 | 12/2007 | Jones et al. | |

OTHER PUBLICATIONS

Phillips, Jeffrey and Levine, Phillip, "Gas Turbine Performance Upgrade Options", Jul. 2002, Insight Magazine, U.S.

* cited by examiner

*Primary Examiner* — Phutthiwat Wongwian
(74) *Attorney, Agent, or Firm* — Dennis D. Brown; Brown Patent Law, P.L.L.C.

(57) ABSTRACT

A method and apparatus for boosting the performance of gas turbine engines, pipelines, and other applications using gas turbine engine systems. A pressurizing device or other source is preferably used to deliver an intake air stream to the gas turbine engine at at least 2% above atmospheric pressure. The pressurizing device or other source is preferably not mechanically driven by the gas turbine engine itself.

9 Claims, 4 Drawing Sheets

METHOD AND APPARATUS FOR BOOSTING GAS TURBINE ENGINE PERFORMANCE

FIELD OF THE INVENTION

The present invention relates to apparatuses and methods for improving emissions and enhancing the performance of gas turbine engines and to gas turbine engine systems which use and are produced by such apparatuses and methods.

BACKGROUND OF THE INVENTION

Gas turbine engines are commonly used for numerous different purposes and applications. Unless stated otherwise, the term "gas turbine engine" is used herein and in the claims to refer generally to the well known type of internal combustion rotary engine which comprises: an air intake; an air intake compressor; a combustor; a power turbine; and an exhaust. All of these components are typically contained within a single engine housing. The engine compressor typically employs a series of rotating and stationary compressor blades to compact and pressurize the intake air. In the combustor, fuel is added to the pressurized air and ignited whereby the hot combustion gas formed in the combustor then expands through stationary nozzles and moves at high velocity into the turbine section. In the turbine section, the energy from the high velocity combustion gas is converted into useful rotational power through the expansion of the heated compressed gas over a series of turbine rotor blades. This rotational power is then, for example, delivered to driven equipment through a rotating power output shaft, typically via a speed reduction gearbox. The hot engine exhaust can be discharged to the atmosphere or used for other purposes such as, e.g., heat recovery for various purposes, cogeneration systems utilizing waste heat steam generation to power a conventional steam turbine in a combined cycle configuration with the gas turbine, etc.

In addition to being used as propulsion engines for aircraft, watercraft, and land vehicles, gas turbine engines are also used as industrial engines for numerous purposes including, but not limited to: electrical power generation; oil and gas production, processing, transporting, and pipeline transmission; and as direct mechanical power drive systems in many other applications.

Industrial gas turbine engine systems are employed for electrical power generation in distributed industrial and central utility station power plants, industrial processing facilities, and in all manner of public and private buildings and institutions. Said systems can be used as base load systems, peak shaving systems, combined heat and power (e.g., cogeneration) systems, stand-by or emergency systems, distributive power systems, etc.

The fuel combusted in gas turbine engines provides the chemical energy that is converted into shaft power, which powers the engine compressor, drives the load and is exhausted. Typically, gas turbine engines use a single fuel. The fuel will often be, for example, the fluid that is being compressed or pumped in a pipeline by a compressor or pump driven by the engine. Many times alternative sources of energy could be used to provide the needed shaft power, with lower overall cost, but there is currently no method of incorporating these sources into gas turbine based power systems.

Figure 1:
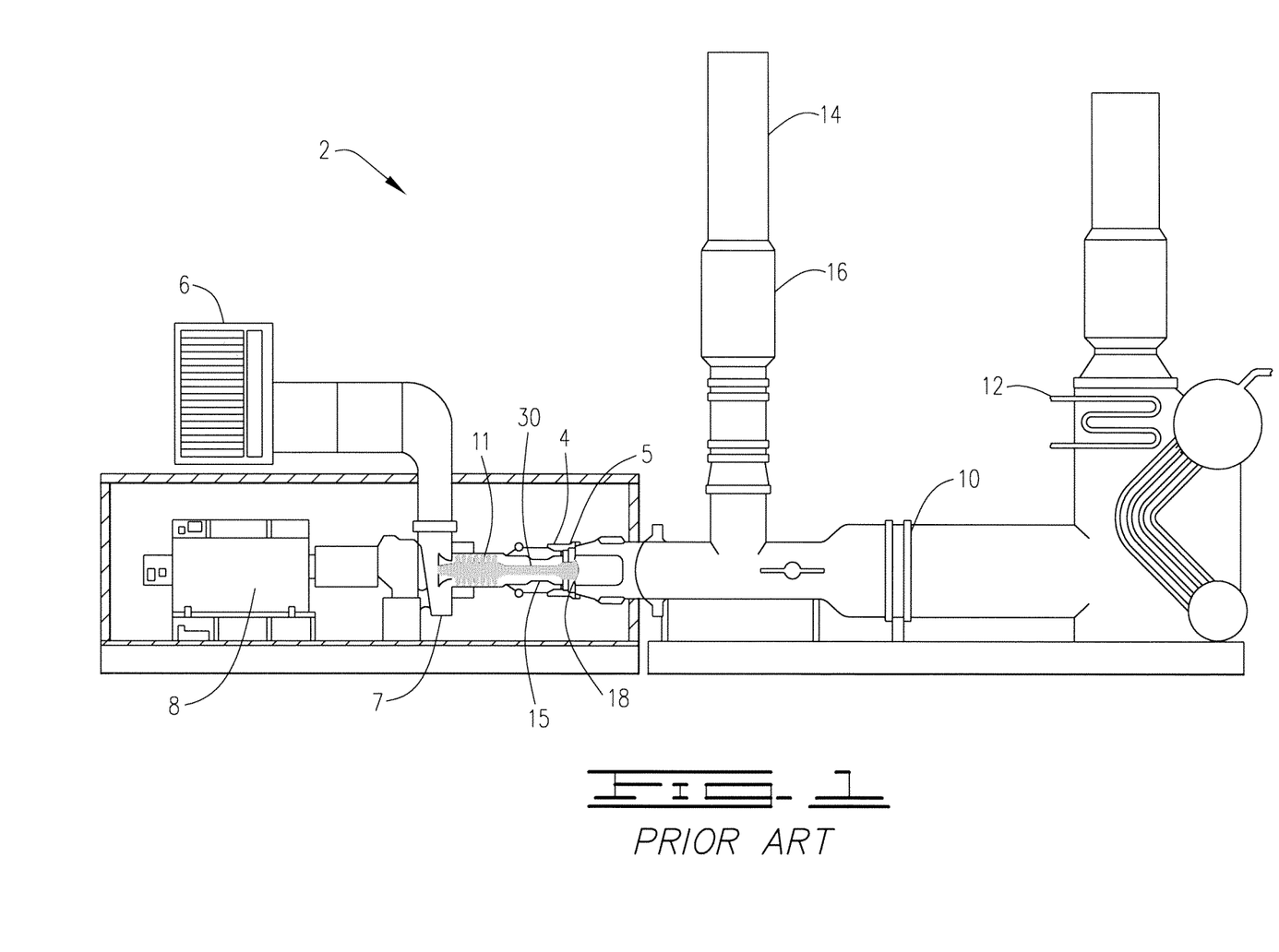
FIG. 1 schematically illustrates a prior art gas turbine engine system 2 for electrical power generation.

An example of a prior art gas turbine engine system 2 for electrical power generation is illustrated in FIG. 1. The prior art system 2 is a combined heat and power system comprising: a gas turbine engine 4 having an engine housing 5; an air inlet filter 6 through which air flows to the air intake 7 of the engine housing 5; an electrical power generator 8 which is driven by the engine 4; a supplemental burner 10 wherein all uncombusted or partially combusted materials remaining in the engine exhaust are burned; a heat recovery steam generator 12 or other heat recovery system which recovers heat energy from the hot exhaust stream; and an exhaust bypass 14 and silencer 16 which can optionally be used to deliver the engine exhaust directly to the atmosphere rather than through the heat recovery system 12.

In the oil and gas industry, common uses of industrial gas turbine engine systems include, but are not limited to: (a) driving centrifugal gas compressors or reciprocating compressors for gas pipeline transmission, natural gas gathering, gas storage and withdrawal, gas lifting, and export sales gas; (b) as power for pump drive systems for transporting crude oil, transporting other liquids, water flood operations, etc.; (c) as compressor drive systems for other operations such as air compression, refrigeration, etc.; and (d) electrical power generation for offshore platforms, FPS power generation, gas production and processing facilities, etc.

Figure 2:
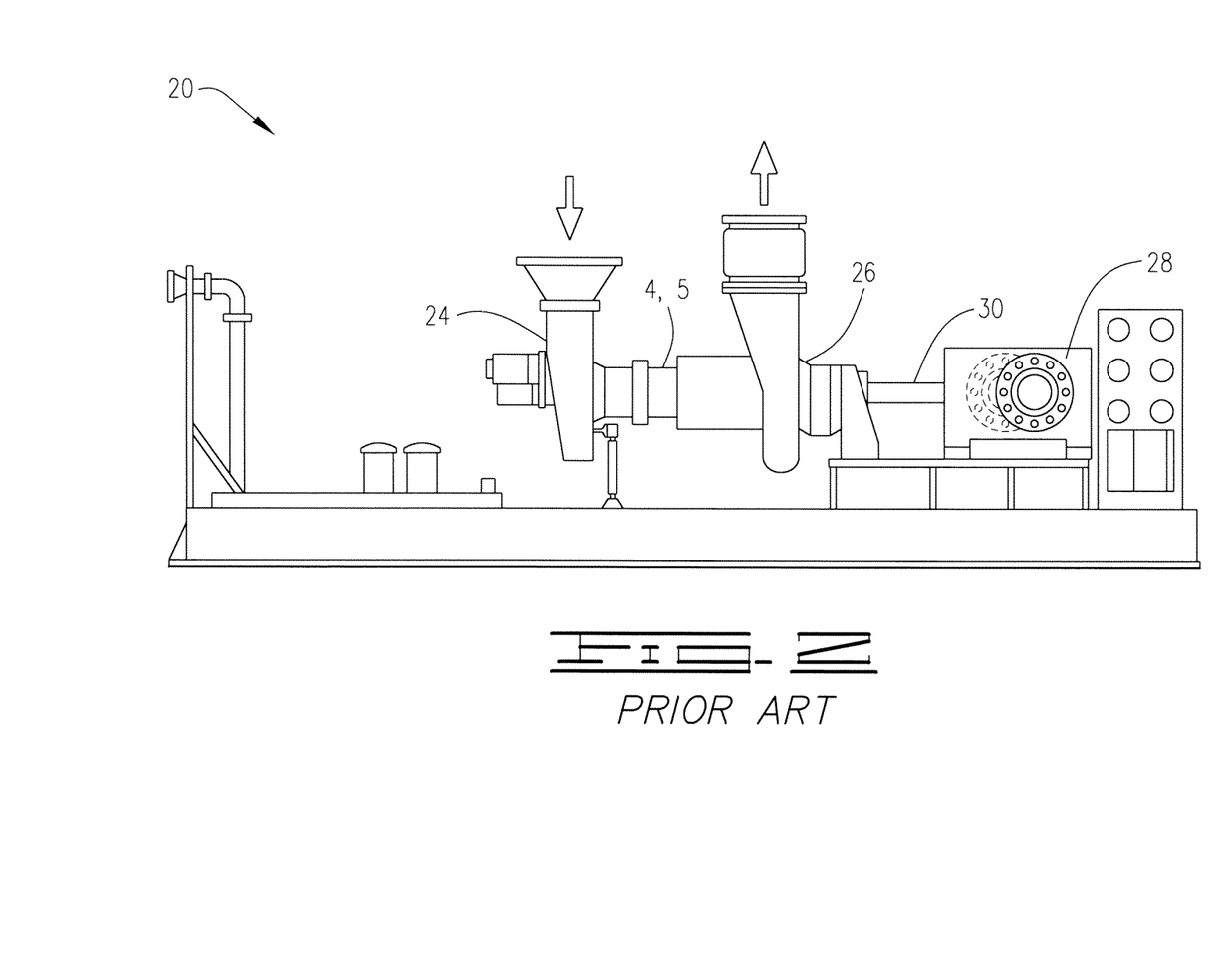
FIG. 2 schematically illustrates a prior art gas turbine engine powered system 20 for compressing and/or transmitting natural gas.

An example of a prior art gas turbine powered system 20 for compressing and/or transmitting natural gas is illustrated in FIG. 2. The prior art gas compression system 20 comprises: a gas turbine engine 4 of the same type used in the system of FIG. 1; a turbine air inlet duct 24 provided with an air intake filter (not shown); a turbine exhaust duct 26; and a centrifugal gas compressor 28 which is driven by the turbine power shaft 30.

Gas turbine engines are commonly in use in gas transmission pipeline stations throughout the United States and the rest of the world. The U.S. interstate natural gas pipeline network relies on more than 1,200 natural gas compressor stations to maintain the continuous flow of natural gas from supply areas to consumers. The purpose of each compressor station is to boost the pressure in the natural gas pipeline and move the gas further downstream. Such stations are typically situated between 50 and 100 miles apart along the length of a gas pipeline system and are designed for continuous pipeline operation. The average station is capable of moving about 700 million cubic feet of natural gas per day, while the largest can move as much as 4.6 billion cubic feet per day.

Although mainline natural gas compressor stations vary widely in size and layout, the basic components of such stations include compressor units, scrubber/filters, cooling facilities, emergency shutdown systems, and computerized flow control and dispatch systems that maintain the operational integrity of the stations. Similar compressor stations are also used at underground natural gas storage sites for injection and withdrawal operations and in production areas where operational wellhead pressures are not always enough to move the flow into the high-pressure mainline or gathering header systems.

Most natural gas compressor stations are unmanned and monitored by an off-site supervisory control and data acquisition system that manages and coordinates the operations of several compressor stations linked together in a natural gas pipeline system. Almost all mainline compressor stations have multiple compressor units. The onsite computerized flow control system will typically manage these units so that only the appropriate number of units required to meet current flow requirements are operating at any given time, thus attempting to optimize operational efficiency and extend the life of the equipment.

Figure 3:
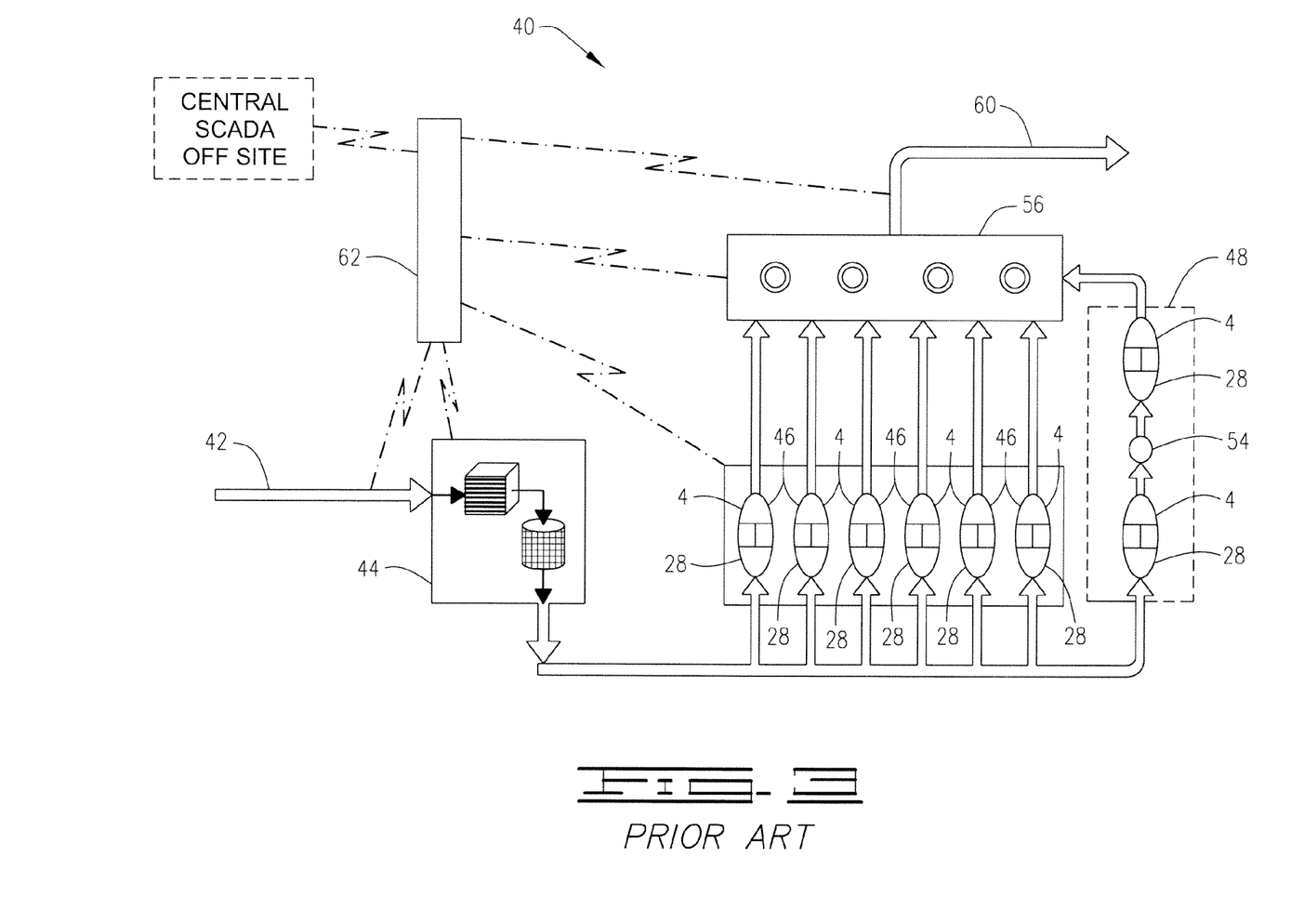
FIG. 3 schematically illustrates a prior art gas pipeline compressor station 40.

An example of a prior art gas pipeline compressor station 40 is illustrated in FIG. 3. The prior art compressor station 40 comprises: a pipeline gas intake flow line 42 from the gas mainline; scrubbers and filters 44 for the gas stream; a plurality of turbine engine driven gas compressor systems 46, with turbine engines 4 driving compressors 28 of the same type shown in the system of FIG. 2, which can be operated one at a time and/or in various parallel combinations; an alternative or additional series arrangement 48 comprising two turbine driven compressors 28 operating in series with an interstage cooler 54 for cooling the partially compressed natural gas between the two compressors 28; after cooler systems 56 for cooling the compressed natural gas before returning the repressurized gas to the main line 60; and an offsite supervised control and data acquisition system 62 that manages and coordinates the operations of the several compressor systems 46 and/or 48.

As will be understood by those in the art, pumping station systems similar to the compressor station system shown in FIG. 3 are used for pumping crude oil, refined products and other fluids through liquid pipelines. The primary differences being that, in the liquid pumping station, the turbine engines will be used to drive pumps and no after cooling will be required.

When used in the oil and gas, power generation, and other types of applications discussed above, gas turbine engines are relied upon to provide a steady power output, oftentimes when other power producing equipment is operating at maximum capability, such as during periods of hot weather. Also, in many oil and gas applications, power generation applications, etc., gas turbine engines must be installed and operated at significant elevations above sea level. Unfortunately, however, at higher ambient air temperatures and/or higher elevations, the power output of a gas turbine engine will be significantly less than the rated power output of the engine at ISO conditions (i.e., operation at sea level with an ambient air temperature of 15° C. (59° F.)).

Because, during operation, the internal air compressor of a gas turbine engine runs within a specific speed range, or at a constant speed, the volume of intake air flowing into a gas turbine engine will be essentially constant, regardless of ambient conditions and air density. As a result, the mass of the air received by the engine will vary with density and have a significant impact upon the power output provided.

As mentioned above, the rated power output for a gas turbine engine is typically based upon operation at sea level with an ambient air temperature of 15° C. (59° F.) and a relative humidity of 60% (i.e., ISO conditions). However, when operating, for example, at an altitude of 3,000 feet above sea level and an ambient air temperature of 100° F., the significantly lower air density encountered under these conditions will typically reduce the resulting power output of the engine to as little as 35% of its rated power output or less. (On the other hand, it is important to note for purposes of the present invention that the power curve for a gas turbine engine is such that the engine's power output can also significantly exceed the rated power output when the engine is operated at air density conditions (e.g., sea level operation at cold winter temperatures) wherein the air is more dense than at ISO conditions).

Consequently, when significantly lower air density conditions are encountered due to higher ambient temperature and/or higher elevations, it has been necessary heretofore to add additional fuel to the engine in order to compensate for the lower air mass flow through the engine and thereby increase the power output. Unfortunately, in addition to other disadvantages and harmful effects, the increased engine fuel-to-air ratio increases the engine combustion temperature and thus operates to: (a) increase the levels of thermally generated nitrous oxide (NOx) and other greenhouse gas emissions discharged in the engine exhaust, (b) test the metallurgical temperature limits of the engine components, (c) accelerate and increase the need for engine maintenance and part replacement, and (d) reduce the life of the engine.

Moreover, because of the significant variability in available power output which can occur on a seasonal, daily, or even hourly basis due to significant changes in ambient air conditions, it has been necessary heretofore to compensate for such periods of low available power output by adding and operating additional engines. However, this approach is very costly in additional fuel and maintenance expense, and results in higher total emissions, and largely does not address directly the poor efficiency, high combustion temperature, and emissions problems experienced when operating gas turbine engines at air densities significantly lower than at the original ISO design conditions.

Also, in addition to the need for an effective and efficient solution to these problems, a need exists for systems, methods, and improvements which will allow existing turbine engines already in the field to meet increasingly stringent governmental emissions standards and requirements. Industrial gas turbine engines of the type discussed above are typically constructed to provide decades of reliable service if properly maintained. In fact, in gas pipeline transmission operations, the majority of mainline compressor stations currently in operation are at least 30 years old. However, although these existing systems still have many remaining years of useful life, the ability to continue to operate these engines, without extensive internal combustion system modifications and having to pay significant emissions related penalties, is very much in question. Current trends include replacing gas turbine powered compressors with electrical motor driven compressors, to escape emissions penalties.

Unfortunately, the solutions offered heretofore by turbine engine manufacturers for improving emissions have focused on replacing existing turbine engines with new low NOx version turbine engine systems. However, as will be apparent, the capital cost of replacing all existing industrial turbine engine systems in order to comply with current emissions requirements would be excessive.

As for prior efforts to address swings in power availability due to varying ambient temperatures, these have involved various forms of inlet air cooling, aimed at increasing density, which, unfortunately, have burdened the engine with higher parasitic operating loads and costs.

Moreover, to compensate for reduced gas turbine power at high altitude stations, the practice in the industry has simply been to use larger gas turbines with the associated higher capital and operating costs. Similarly, the only way to incorporate alternative sources of power into gas turbine based power systems has been to add additional driven loads within the station.

SUMMARY OF THE INVENTION

The present invention alleviates the problems and satisfies the needs discussed above. The present invention provides a boosting method and apparatus for significantly improving the emissions and performance of any type of gas turbine engine, in generally any application, by increasing the density, and thus the mass flow, of the air traveling through the engine. Consequently, the present invention lowers the necessary fuel-to-air ratio required to achieve a given power output and also lowers the engine combustion temperature and emissions.

The inventive boost system thus operates to: (a) reduce the production of NOx emissions; (b) significantly increase the available power output from the engine at any ambient temperature or altitude; (c) provide consistent available power output from a given system throughout the year and at all times of the day; (d) protect the engine and reduce maintenance requirements by avoiding operation at temperatures which test or exceed the metallurgical limits of the engine components; (e) improve overall fuel efficiency by increasing the cycle pressure ratio; and (f) allow older existing engines to meet and comply with increasingly stringent emission standards and regulations.

The present invention is particularly effective, for example, for improving the performance of gas turbine engines at higher elevations and for accounting for periodic losses of available power due to higher ambient temperatures and/or significant temperature swings. Moreover, in most applications, the engine fuel savings and other benefits realized will greatly exceed the cost and energy requirements of the inventive boost system.

Additionally, the present invention provides a way to incorporate alternative sources of power into an existing gas turbine based system by allowing the boost apparatus energy to be supplied by other prime movers. Thus, lower cost alternative energy sources can be used to minimize the use of premium fuels (i.e., the inventive boost system can be powered, for example, by the use of off-peak electricity vs. natural gas, the use of hydro power vs. fuel oil, the use of steam recovered from the hot turbine exhaust, etc.)

The inventive boosting method and apparatus can be used to improve the performance of gas turbine engines operating in any stationary or mobile application on land or offshore, or in gas turbine applications for propulsion of aircraft, watercraft, or land vehicles. The inventive boosting method and apparatus are particularly well suited for boosting the performance of stationary gas turbine engines used to drive devices installed in fixed position at geographical sites on land and offshore. Examples of such applications include, but are not limited to: the use of a gas turbine engine 4 as illustrated in FIG. 2 to drive a fluid pressure boosting device 28 such as a gas compressor or a liquid pump; the use of a gas turbine engine 4 as illustrated in FIG. 1 for driving an electrical power generator 8; or the use of gas turbine engines 4 for driving any one of, a plurality of, or all of the compressors, pumps, or other fluid pressure boosting devices 28 used in a pipeline system as illustrated in FIG. 3 for transmitting oil, gas, or other fluids.

As illustrated in FIG. 1, the gas turbine engine 4 used in such applications will typically be constructed as unitary structure having, within the engine housing 5: (a) an air intake section 7 with an engine compressor 11 installed therein for compressing the engine air intake stream, (b) an internal combustion section 15 for adding fuel to the compressed air stream and combusting the fuel to produce a combustion gas stream, and (c) an engine power turbine 18 through which the combustion gas stream flows and expands. The engine 4 will also typically include a rotating power output shaft 30, which is driven by the power turbine 15, and an associate gear box, for driving the compressor 28, pump, electrical power generator 8, or other device linked to the engine.

In one aspect, there is provided a method of improving the performance of a gas turbine engine wherein the gas turbine engine comprises an air intake section having an engine air compressor therein for receiving and compressing an intake air stream and the gas turbine engine is operated at a geographical site having atmospheric air at an actual ambient air pressure external to the gas turbine engine. The method comprises the step of delivering the intake air stream to the intake air section of the gas turbine engine from a source which supplies the intake air stream to the intake air section at a pressure which is at least 2%, more preferably at least 5%, and most preferably at least 10% greater, than the actual ambient air pressure of the atmospheric air. In addition, the source is preferably not mechanically driven by the gas turbine engine being boosted.

The intake air source used in this method can be a device or system capable of providing continuous supply for continuous operation of the engine, or a sufficient stored volume of compressed air, for short term, intermittent modification of the control parameters of the system. However, the source will preferably be a pressurizing device which will continuously provide the intake air stream by pressurizing atmospheric air and delivering the pressurized atmospheric air stream to the intake air section of the gas turbine engine. The pressurizing device will preferably be a fan or compressor which is driven by an electric, steam, hydro, wind or combustion powered motor, turbine, or other prime mover other than the gas turbine engine being boosted and will most preferably be an electric motor.

Further, this method also preferably comprises the step, prior to delivering the intake air stream to the air intake section of the gas turbine engine, of cooling the stream of atmospheric air either (a) after the stream of atmospheric air is pressurized by the fan, compressor, or other pressurizing device, (b) before the stream of atmospheric air is pressurized by the pressurizing device or (c) both before and after the stream of atmospheric air is pressurized by the air pressurizing device. Also, this method can additionally comprise the step of humidifying the stream of atmospheric air before or after the stream of atmospheric air is pressurized by the air pressurizing device.

In another aspect, there is provided a method of improving the emissions and performance of a stationary gas turbine engine which drives an apparatus installed in fixed position at a geographical site wherein the gas turbine engine comprises an air intake section having an engine air compressor therein for receiving and for compressing an intake air stream. The method comprises the step of using an air pressuring device external to the gas turbine engine to deliver the intake air stream to the air intake section of the gas turbine engine at a pressure which is at least 2%, more preferably at least 5%, and most preferably at least 10%, greater than the actual atmospheric ambient air pressure at the geographical site. The air pressurizing device is preferably not driven by the gas turbine engine being boosted. By way of example, but not by way of limitation, the apparatus driven by the gas turbine engine at the geographical site can be an electrical power generator, a gas compressor, or a pump.

In another aspect, there is provided an improvement to an apparatus of a type comprising a stationary gas turbine engine which drives a device installed in fixed position at a geographical site wherein the gas turbine engine comprises an air intake section having an engine air compressor therein. The improvement comprises a pressurizing device which is external to the stationary gas turbine engine and which pressurizes atmospheric air at the geographical site to produce a pressurized air stream which is delivered to the air intake section of the stationary gas turbine engine. The improvement also preferably comprises the pressurizing device being either a compressor which is not mechanically driven by the gas turbine engine or a fan that is not mechanically driven by the gas turbine engine. In addition, the improvement preferably comprises the device which is driven by the stationary gas turbine engine being a compressor, pump, or other fluid pressure boosting device or an electrical power generator.

In another aspect, there is provided a method of improving the performance of a pipeline system wherein: (a) the pipeline system has multiple fluid pressure increasing devices which are driven by stationary gas turbine engines and are installed at a plurality of geographical locations along the pipeline system for increasing a pressure of a fluid being transmitted in the pipeline system; (b) the geographical locations have altitudinal elevations corresponding to the geographical locations; and (c) each of the stationary gas turbine engines has air intake section with an engine air compressor therein. The method comprises the step of boosting an available power output of one or more of the stationary gas turbine engines wherein, due to the altitudinal elevations of the geographical locations or atmospheric temperatures at the geographical locations or a combination of the altitudinal elevations and atmospheric temperatures at the geographical locations, the one or more stationary gas turbine engines would each at least periodically be unable to operate at more than 90% of power output at ISO conditions if the atmospheric air at the geographical locations of the one or more stationary gas turbine engines were only filtered and received directly into the air intake section of each of the one or more stationary gas turbine engines without prior modification. In the step of boosting, the power output of each of the one or more stationary gas turbine engines is boosted by using an external fan or compressor, the external fan or compressor not being mechanically driven by any of the one or more stationary gas turbine engines, to pressurize the atmospheric air at an outlet to inlet pressure ratio of at least 1.02 prior to the atmospheric air being received by the air intake section.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 4:
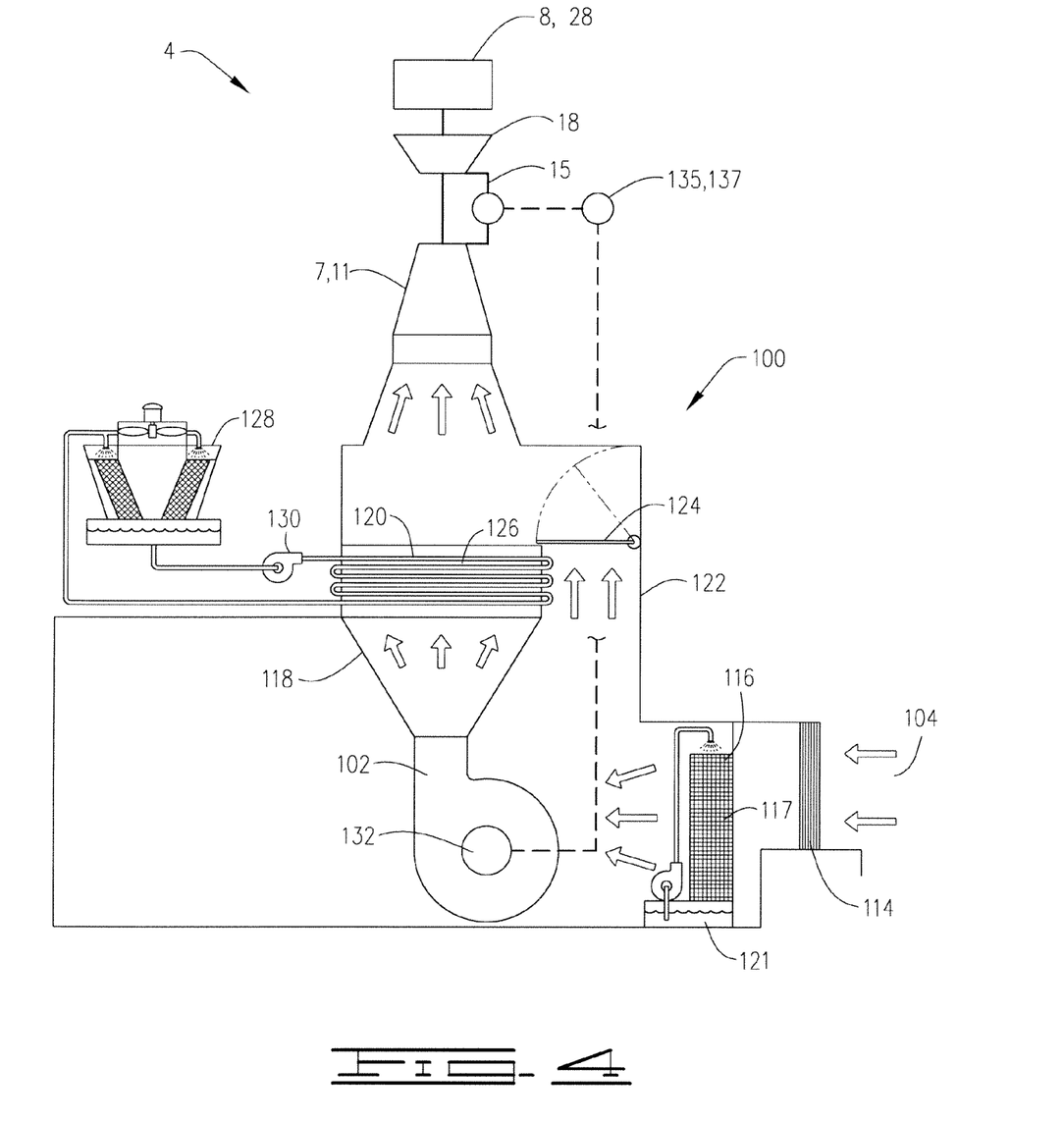
FIG. 4 schematically illustrates an embodiment 100 of the inventive boost system used to boost the performance of the gas turbine engine 4 employed in the application of FIG. 1, the application of FIG. 2, the application of FIG. 3, or in any other application.

An embodiment 100 of the inventive boost system is illustrated in FIG. 4. By way of example, FIG. 4 illustrates the use of the inventive boost system 100 in improving the performance of a stationary gas turbine engine 4 in use in any of the applications shown in FIGS. 1-3 for driving an electrical power generator 8, a gas compressor 28, or any desired number of the compressor or pump systems 46 employed in an oil or gas pipeline transmission system. However, as will be understood by those in the art, the inventive boost system 100 can be used to improve the performance of generally any type of stationary gas turbine engine or other gas turbine engine. Moreover, the gas turbine engine boosted by the inventive system 100 can be used to drive generally any desired type of fixed or mobile device. In addition, it will be understood that the inventive boost system 100 can be permanently installed at a desired geographical site or can be trailer-mounted, barge-mounted, or otherwise assembled in mobile form to allow the inventive system 100 to be transported from one geographical site to another.

The inventive boost system 100 comprises a pressure boosting device 102 which is used to continuously compress/increase the pressure, and thus the density, of the atmospheric air stream 104 which is received by the engine air intake section 7 of the gas turbine engine 4. Thus, at any given engine operating speed, the use of the pressure-boosting device 102 to increase the pressure of the intake air stream results in significantly increased air mass flow through the gas turbine engine 4.

In the gas turbine engine 4, the intake air stream is compressed by the internal engine air compressor 11 within the intake air section 7 and the resulting compressed air stream then flows to the engine combustion section 15. In the combustion section 15, the engine fuel is added to the compressed air stream and combusted to form a combustion gas stream. The combustion gas stream then flows through the engine power turbine 18 wherein the flow and expansion of the combustion gas causes the turbine 18 to rotate which, in turn, causes the rotation of the engine power shaft 30 which drives the compressor 28, pump, electrical power generator 8, or other device to which the engine is linked.

It will also be understood by those in the art that a single inventive boost system 100 can alternatively be used to provide pressurized and/or cooled air intake for more than one gas turbine engine 4.

In the embodiment 100, the pressure boosting device 102 can be a compressor, a fan, or any other device effective for continuously receiving atmospheric air and supplying the air stream to the engine air intake 7. The pressure boosting device 102 will preferably be effective for increasing the pressure of the atmospheric air delivered to the engine by at least 2% above ambient pressure (i.e., an outlet to intake pressure ratio of 1.02). The pressure boosting device will more preferably increase the pressure of the atmospheric air stream by at least 5% and most preferably at least 10%.

The pressure boosting device 102 will preferably be a single or multistage centrifugal, axial or other style fan or centrifugal, axial, reciprocating, hydraulic or other style compressor, of the type heretofore used for heating, ventilation and air conditioning (HVAC) systems, process air supply, combustion air supply, material transport systems, etc. As will be understood by those in the art, a fan or compressor of this type will typically provide compressed/pressurized air at an outlet-to-inlet pressurization ratio in the range of from a lower pressurization ratio value of 1.02 to an upper pressurization ratio value of 1.5.

The inventive boost system 100 illustrated in FIG. 4 further comprises: an inlet air filter 114; a pre-boosting cooler 116 between the air filter 114 and the pressure boosting device 102; a boosted air duct 118 for delivering the pressurized air from the boosting device 102 to the engine air intake 7; a post-boosting air cooler 120 which cools the pressurized intake air as it flows from the discharge of the pressure boosting device 102 to the engine air intake 7; and a bypass duct 122 and associated damper 124 which can optionally be used for bypassing the pressure boosting device 102 to deliver filtered atmospheric air directly to the engine air intake 7.

The pre-boost air cooler 116 can be a direct evaporative cooling system, of the wetted media, spray, or fogging type, an indirect evaporative cooling system, a mechanical or absorption refrigerated system, or any other type of cooling system capable of cooling the intake air. As illustrated in FIG. 4, the pre-boost air cooler 116 will preferably be an evaporative-type cooler wherein the intake air 104 is directly contacted with the water on the surface of a wetted media to cool the intake air and to also humidify the intake air 104 so that the intake air stream entering the pressure boosting device 102 will preferably be cooled to a temperature within about 5° F. of its wet bulb temperature. As illustrated in FIG. 4, the evaporative cooler 116 preferably comprises: a distribution grid of wetted media 117 through which the incoming air is evenly contacted with water and a water recirculation system 121 which continuously recirculates water to the top of the distribution grid 117.

The cooling system 120 used for cooling the pressurized air stream prior to its delivery to the engine air intake 7 can also be generally any type of direct or indirect evaporative or coil based cooling system which is effective for cooling the pressurized air stream. As a result of increasing the pressure of the intake air stream using the pressure boosting device 102, the temperature of the air stream will also be increased such that the temperature of the boosted air discharge from the boosting device 102 will be higher than that of the boosting device intake. The post-boosting cooler 120 will preferably be effective for again reducing the temperature of the air to within 5° F. of the dew point temperature at its boosted pressure.

As will be understood by those in the art, decreasing the temperature of the air intake in this manner using the pre-boosting air cooler 116 and/or the post-boosting air cooler 120 further operates to increase the engine intake air density and the mass flow through the gas turbine engine, thus further improving the available horse power, reducing engine temperatures, improving efficiency, etc.

As illustrated in FIG. 4, the post-boost air cooling system 120 preferably comprises a finned coolant coil 126 which is installed in the boosted air duct 118 downstream of the pressure boosting device 102. The coolant delivered through the finned coolant coil 126 will preferably be water or other aqueous coolant. However, other coolant materials can alternatively be used.

Assuming that the coolant is water, the post-boosting cooling system 120 preferably further comprises an evaporative style cooling tower 128 for removing heat from the water coolant and a cooling water pump 130 for circulating water from the cooling tower 128 through the coolant coil 126.

In the present invention, pressure boosting device 102 is preferably a device which is not mechanically driven by the gas turbine engine 4. Although other types of boosting device drive systems can alternatively be used, the inventive boosting system 100 illustrated in FIG. 4 further comprises a separate drive motor or turbine 132 which is used for driving the pressure boosting device 102. The drive motor or turbine 132 is preferably either (a) an electric motor or (b) a steam turbine or (c) a combustion motor which can use a fuel which is the same as or different from the fuel used in the gas turbine engine 4 or (d) a hydro turbine or (e) a wind turbine or (f) any other source of shaft power capable of driving a fan or compressor. The stipulation that, in the preferred embodiment, the pressure boosting device 102 is not mechanically driven by the gas turbine engine does not preclude, however, the possibility that electricity used to power the drive motor or turbine 132 may have been produced at least in part by a generator 8 driven by the gas turbine engine (see FIG. 1) or that, for example, the pressurization device 102 might alternatively be driven by a turbine system utilizing steam that was produced at least in part from heat recovered in an engine exhaust heat recovery system 12 (see FIG. 1).

The drive motor or turbine 132 or other system used for driving the pressure boosting device 102 can be a single/constant speed device or can be a variable speed device capable of discrete adjustment (e.g., high, medium, and low speed) or continuous adjustment over a speed range. Consequently, in accordance with the inventive method, an automated speed control system 135 for the pressure boosting device 102 can be used to automatically adjust the speed of the pressure boosting device 102 to optimize the performance of the boosting and engine system based upon readings or data concerning, for example, ambient temperature, ambient air pressure, one or more operating temperatures of the gas turbine engine 4, the engine exhaust temperature, the power output of the engine 4, the level of NOx emissions in the engine exhaust, the level of greenhouse gas emissions in the exhaust, the level of other pollutant emissions in the exhaust, readings related to the device being driven by the engine 4, (e.g., the throughput of a compressor or pump 28 or the electrical power production rate of a generator 8), or any combination of these or other parameters. In addition, or alternatively, as when using a single/constant speed pressure boosting device 102, an automated activation system 137 can similarly be used to activate the pressure-boosting device 102 (i.e., turn the device 102 off and on) based upon predetermined trigger values for some or all of the same or other process, engine, or ambient conditions, variables, and parameters listed above.

Although the operational control of the boost system 100 and the engine operating system can alternatively be linked in any manner desired, the operational control system of the gas turbine engine 4 will preferably be independent from the boost system 100 such that the gas turbine engine 4 will continue to operate as though the intake air which it receives is coming directly from the atmosphere. Consequently, in accordance with the inventive method, when the inventive boost system 100 is in operation to increase the density of the intake air stream by compression and/or cooling, the changed condition of the intake air stream as a result of the operation of the inventive boost system 100 will automatically be sensed by the control system of the gas turbine engine 4 just as though, for example, a sudden drop in ambient air temperature has occurred. The existing control system of the gas turbine engine 4 will then automatically adjust the fuel ratio and/or other adjustable operating parameters of the gas turbine engine 4 to account for the beneficial increase in the density of the intake air stream and the resultant increase in air mass flow through the engine. These automatic engine adjustments then in turn operate to reduce engine operating temperatures, reduce NOx emissions, reduce other emission levels, etc.

Consequently, the fact that the gas turbine engine 4 can be, and preferably is, operated independently of the inventive boost system 100 further facilitates the convenient and simple installation and use of the inventive boost system 100 in conjunction with any existing or new gas turbine engine system. Although it may be desirable in some circumstances to provide for the pressure boosting device 102 to be automatically turned off and on when, for example, the engine is one which itself will be turned off and on as needed for intermittent use, even the activation of the inventive boost system 100 can, if desired, be completely independent of the engine operating and control system.

In another aspect of the inventive method, the inventive boost system 100 is used to improve the efficiency, throughput, carbon footprint, NOx emissions levels, or other parameters of all or a portion of a pipeline system used for transmitting hydrocarbon gas, crude oil, refined petroleum products, or other fluids. In accordance with the inventive method, one or more inventive boost systems 100 can be installed as needed to improve the performance of one, all, or any other number of gas turbine engine systems 46 or 48 (see FIG. 3) used in the pipeline, either on a continuous or intermittent basis, for driving compressors 28, pumps, or other devices for boosting the pressure of the fluid transmitting through the pipeline.

In a preferred embodiment of the inventive pipeline method, the altitudinal elevations, seasonal temperatures, seasonal humidity levels, and/or other relevant parameters characteristic of the geographical locations of the various pipeline compressor and/or pumping stations 40 (see FIG. 3) are first evaluated to determine where the installation and use of the inventive boosting systems 100 would be most beneficial for boosting pipeline throughput, providing needed power increases, reducing emission levels, reducing the number of units or stations needed in operation to meet transmission needs, meeting national, state, or area emissions requirements, allowing other older or inefficient systems to be shut down, etc. In accordance with such evaluation, the installation of inventive boosting systems 100 will generally be beneficial in the case of any or all gas turbine engines operating at geographical sites wherein, due to the altitudinal elevations of the sites, the ambient temperatures, and/or swings in ambient temperatures experienced at these locations, the gas turbine engines at the sites would otherwise if directly receiving ambient air, operate at least periodically at less than 90% of their power output at ISO conditions, or at emissions levels that are considered excessive, during any of the expected duty cycles of the stations.

It will also be understood, however, that the inventive boosting system 100 can be used to significantly increase the available power and improve the overall performance of gas turbine engines under any conditions, even at sites where the engines are able to operate at rated atmospheric and elevational conditions, or better, year round.

EXAMPLE

A Solar Saturn 20 gas turbine compressor drive engine having a rated shaft power output of 1.4 MW at ISO conditions is operated at a site wherein the site elevation is 2900 feet above sea level, the ambient air temperature is 120° F., and the ambient relative humidity is 0.1. The Solar Saturn 20 engine is first operated with direct intake of filtered air from the atmosphere and is used to drive a natural gas compressor. At these atmospheric air conditions and an altitude of 2900 feet, the engine will operate at an efficiency of 0.2032 and provide an engine shaft power output of 0.9423 MW. The net power provided to the gas compressor which is driven by the Solar Saturn 20 engine will be 0.731 MW.

In accordance with the present invention, under these same atmospheric and elevational conditions, an inventive boost system 100 using an electrically driven centrifugal boosting fan 102, a pre-boosting evaporative cooler and humidifier 116, and a post-boosting water coolant system 126 is used to provide intake air to the Solar Saturn 20 engine at a pressure of 16.51 psia, a temperature of 79.5 F, and pressure dew point of 85 F. When operated using the boosted air intake stream, the Solar Saturn 20 engine will operate at an efficiency of 0.2329 and will provide an engine shaft power output of 1.4079 MW. The power provided to the natural gas compressor linked to the Solar Saturn engine will be 1.1734 MW.

In addition, the boost assembly will require only 167 kW of electrical power, approximately 3.2% of the total energy consumed by the entire system.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A method of improving emissions from a gas turbine engine wherein:

said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion; and (3) an engine power turbine within said engine housing through which said engine exhaust stream flows and expands;

said gas turbine engine is operated at a geographical site having atmospheric air at an actual ambient air pressure and an actual ambient air temperature external to said gas turbine engine;

said method comprises the step of (a) automatically monitoring a parameter which has a direct or indirect relationship to an amount of an emission in said engine exhaust stream; and said method further comprises the step of (b) automatically controlling a density of said intake air stream, prior to said intake air stream entering said air intake section of said gas turbine engine, based upon said parameter monitored in step (a) such that said amount of said emission in said engine exhaust stream does not exceed a predetermined level, wherein said intake air stream is a stream of said atmospheric air and said density of said intake air stream is automatically controlled in step (b) by changing a pressure of said intake air stream, said density of said intake air stream is automatically controlled in step (b) at least in part by automatically controlling an air pressurizing device for pressurizing said intake air stream, and said air pressurizing device is a centrifugal fan.

2. The method of claim 1 wherein said centrifugal fan pressurizes said stream of said atmospheric air at an outlet to inlet pressure ratio in a range of from a lower range value of 1.02 to an upper range value of 1.5.

3. The method of claim 1 wherein said gas turbine engine drives a stationary apparatus installed in fixed position at said geographical site.

4. A method of improving emissions from a gas turbine engine wherein:

said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion, and (3) an engine power turbine within said engine housing through which said engine exhaust stream flows and expands;

said gas turbine engine is operated at a geographical site having atmospheric air at an actual ambient air pressure and an actual ambient air temperature external to said gas turbine engine;

said method comprises the step of (a) automatically monitoring a parameter which has a direct or indirect relationship to an amount of an emission in said engine exhaust stream; and said method further comprises the step, when said parameter automatically monitored in step (a) reaches a predetermined value, of (b) automatically activating at least one apparatus which is external to said gas turbine engine to increase a density of said intake air stream, wherein said intake air stream is a stream of said atmospheric air and said apparatus operates to increase said density of said intake air stream in step (b) by increasing a pressure of said intake air stream, said apparatus comprises an air pressurizing device, and said air pressurizing device is a centrifugal fan.

5. A method of improving emissions from a gas turbine engine wherein:

said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion; and (3) an engine power turbine within said engine housing through which said engine exhaust stream flows and expands;

said gas turbine engine is operated at a geographical site having atmospheric air at an actual ambient air pressure and an actual ambient air temperature external to said gas turbine engine;

said method comprises the step of (a) automatically monitoring a parameter which has a direct or indirect relationship to an amount of an emission in said engine exhaust stream; and said method further comprises the step of (b) automatically controlling a density of said intake air stream, prior to said intake air stream entering said air intake section of said gas turbine engine, based upon said parameter monitored in step (a) such that said amount of said emission in said engine exhaust stream does not exceed a predetermined level, wherein said intake air stream is a stream of said atmospheric air and said density of said intake air stream is automatically controlled in step (b) by changing a pressure of said intake air stream, and said density of said intake air stream is automatically controlled in step (b) at least in part by automatically controlling a centrifugal HVAC fan for pressurizing said intake air stream.

6. The method of claim 5 wherein said centrifugal HVAC fan pressurizes said intake air stream at an outlet to inlet pressure ratio in a range of from a lower range value of 1.02 to an upper range value of 1.5.

7. A method of improving emissions from a gas turbine engine wherein: said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion, and (3) an engine power turbine within said engine housing through which said engine exhaust stream flows and expands; said gas turbine engine is operated at a geographical site having atmospheric air at an actual ambient air pressure and an actual ambient air temperature external to said gas turbine engine;

said method comprises the step of (a) automatically monitoring a power production rate of a device driven by said gas turbine engine; and said method further comprises the step, when said power production rate of said device driven by said gas turbine engine automatically monitored in step (a) reaches a predetermined value, of (b) automatically activating at least one apparatus which is external to said gas turbine engine to increase a density of said intake air stream, wherein said intake air stream is a stream of said atmospheric air and said apparatus operates to increase said density of said intake air stream in step (b) by increasing a pressure of said intake air stream, and said apparatus comprises an air pressurizing device.

8. A method of improving emissions from a gas turbine engine wherein:

said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion, and (3) an engine power turbine within said engine housing through which said engine exhaust stream flows and expands;

said gas turbine engine is operated at a geographical site having atmospheric air at an actual ambient air pressure and an actual ambient air temperature external to said gas turbine engine;

said method comprises the step of (a) automatically monitoring a fluid throughput or power production rate of a device driven by said gas turbine engine; and said method further comprises the step, when said fluid throughput or power production rate of said device driven by said gas turbine engine automatically monitored in step (a) reaches a predetermined value, of (b) automatically activating at least one apparatus which is external to said gas turbine engine to increase a density of said intake air stream, wherein said intake air stream is a stream of said atmospheric air and said apparatus operates to increase said density of said intake air stream in step (b) by increasing a pressure of said intake air stream, and said apparatus comprises an air pressurizing device.

9. A method of improving emissions from a gas turbine engine wherein:

said gas turbine engine is a unitary structure comprising an engine housing having (1) an air intake section of said engine housing in which an engine compressor is positioned for receiving and compressing an intake air stream, (2) an internal combustion section which produces an engine exhaust stream comprising products of combustion, and (3) an engine power turbine within said engine housing through which said engine exhaust stream flows and expands;

said gas turbine engine is operated at a geographical site having atmospheric air at an actual ambient air pressure and an actual ambient air temperature external to said gas turbine engine;

said method comprises the step of (a) automatically monitoring a temperature of said engine exhaust stream; and said method further comprises the step, when said temperature of said engine exhaust stream automatically monitored in step (a) reaches a predetermined value, of (b) automatically activating at least one apparatus which is external to said gas turbine engine to increase a density of said intake air stream, wherein said intake air stream is a stream of said atmospheric air and said apparatus operates to increase said density of said intake air stream in step (b) by increasing a pressure of said intake air stream, and
said apparatus comprises an air pressurizing device.

* * * * *

UNITED STATES PATENT AND TRADEMARK OFFICE
CERTIFICATE OF CORRECTION

PATENT NO. : 8,616,005 B1  
APPLICATION NO. : 12/556063  
DATED : December 31, 2013  
INVENTOR(S) : Dennis James Cousino, Sr.

Page 1 of 1

It is certified that error appears in the above-identified patent and that said Letters Patent is hereby corrected as shown below:

In the Claims:

Column 14, Line 31 cancel the text "fluid throughput or"

Column 14, Line 33-34 cancel the text "fluid thoughput or"

Signed and Sealed this
Eleventh Day of March, 2014

Michelle K. Lee
*Deputy Director of the United States Patent and Trademark Office*